United States Patent [19]

Oland

[11] Patent Number: 5,704,474

[45] Date of Patent: Jan. 6, 1998

[54] DISC CARRIER

[76] Inventor: Charles Jeffrey Oland, 10734 Cheryl Road, Winfield, British Columbia, Canada, V4V 1W7

[21] Appl. No.: 758,918

[22] Filed: Dec. 2, 1996

[51] Int. Cl.[6] .................................................. B65D 85/30
[52] U.S. Cl. ........................................ 206/308.1; 206/312
[58] Field of Search ............................ 206/308.1, 309, 206/312, 313, 509, 512, 511, 459.1; 312/9.47, 9.53, 9.56, 9.63

[56] References Cited

U.S. PATENT DOCUMENTS

| | | |
|---|---|---|
| 3,946,865 | 3/1976 | Bierwas . |
| 3,995,737 | 12/1976 | Ackeret . |
| 3,995,921 | 12/1976 | Ackeret . |
| 4,046,255 | 9/1977 | Ackeret . |
| 4,164,782 | 8/1979 | Stewart . |
| 4,266,784 | 5/1981 | Torrington . |
| 4,360,845 | 11/1982 | Tajima et al. . |
| 4,436,201 | 3/1984 | Inaba . |
| 4,463,850 | 8/1984 | Gorog . |
| 4,476,978 | 10/1984 | Saito . |
| 4,702,533 | 10/1987 | Seifert . |
| 4,717,213 | 1/1988 | Bohnet et al. . |
| 5,139,320 | 8/1992 | Banker . |
| 5,213,209 | 5/1993 | Song . |
| 5,360,107 | 11/1994 | Chasin et al. ................... 206/308.1 |
| 5,366,073 | 11/1994 | Turrentine et al. ............. 206/308.1 |
| 5,469,961 | 11/1995 | Chang ................................. 206/509 |

*Primary Examiner*—Jimmy G. Foster
*Assistant Examiner*—Nhan T. Lam
*Attorney, Agent, or Firm*—George A. Seaby

[57] ABSTRACT

While the most popular currently available compact disc carriers are structurally simple, they are lacking in several areas. Such carriers are often difficult to open, they are fragile and thus easily broken, and they are usually stored vertically on edge so that the labels on the spines are difficult to read, and provide no indication of whether a disc is present in the carrier. A compact disc carrier, which deals with these shortcomings, includes a sleeve-like container defined by a top wall, side walls and tracks at the bottom ends of the side walls; and a tray defined by a bottom wall slidable in the tracks, a first pair of ledges on posts at the rear of the tray for supporting the rear edge of a disc, and a second pair of ledges on spring arms near the front of the tray for supporting the front edge of the disc. When a disc is placed on the ledges, the spring arms flex outwardly slightly, and when the tray is slid into the container, the spring arms are bent by the sides of the container, whereby, when the tray is fully inserted into the container, tabs on the free ends of the arms spring outwardly through slots in the sides of the container to provide a visual indication that a disc is present in the carrier. If no disc is present, the tabs remain in the container. Detents are provided on the bottom ends of the container side walls for engaging apertures in the top wall of a subjacent container so that carriers can be stacked horizontally, and will remain releasably latched together.

12 Claims, 3 Drawing Sheets

DISC CARRIER

BACKGROUND OF THE INVENTION

1. Field of the Invention

This invention relates to a disc carrier, and in particular to a compact disc carrier.

While the invention is primarily intended for audio compact discs, it will be appreciated that the carrier can be used for discs containing any information, e.g. video discs or software discs.

2. Discussion of the Prior Art

By far the most popular compact disc carrier currently in use includes a casing or container defined by a bottom and a front end wall; a rectangular tray in the container with a circular recess therein for receiving a disc, spring fingers extending upwardly from the bottom center of the recess for releasably retaining the disc in the recess; and a cover defined by a top wall and a pair of side walls hingedly connected to one end of the tray.

While the conventional compact disc carrier is relatively simple in terms of structure, there are several areas in which such carriers are lacking. For example, the carriers are often difficult to open, particularly for persons lacking in manual dexterity; the hinge system holding the cover on the carrier is fragile and relatively easy to break; the fingers holding the disc in a storage position often break so that the disc is no longer securely retained in the tray; the trays must be stored on edge, because if stacked horizontally, i.e. with the bottom of one tray on top of the cover of a subjacent tray, the trays tend to slide on each other. When the carriers are stored on edge, the label appearing on one end of the spine of the carrier is difficult to read. Moreover, the number of disc carriers arranged on edge is limited by the width of the shelves, which are specially designed to house such carriers. Another, more frustrating deficiency of such carriers is the absence of any indication whether the carrier contains a disc. If a disc is removed from its carrier and the carrier returned to a shelf, it is often necessary to search for the empty carrier, particularly if the disc is left in the player for an extended period of time.

A large variety of alternative carriers are described in the patent literature. Examples of such carriers are found in U.S. Pat. No. 3,946,865, which issued to R. Bierwas on Mar. 30, 1976; U.S. Pat. No. 3,995,737, which issued to P. Ackeret on Dec. 7, 1976; U.S. Pat. No. 3,995,921, which issued to P. Ackeret on Dec. 7, 1976; U.S. Pat. No. 4,046,255, which issued to P. Ackeret on Sep. 6, 1977; U.S. Pat. No. 4,164,782, which issued to M. Stewart on Aug. 14, 1979; U.S. Pat. No. 4,266,784, which issued to L. Torrington on May 12, 1981; U.S. Pat. No. 4,360,845, which issued to O. Tajima et al on Nov. 23, 1982; U.S. Pat. No. 4,436,201, which issued to S. Inaba on Mar. 13, 1984; U.S. Pat. No. 4,463,850, which issued to I. Gorog on Aug. 7, 1984; U.S. Pat. No. 4,476,978, which issued to T. Saito on Oct. 16, 1984; U.S. Pat. No. 4,702,533, which issued to J. Seifert on Oct. 27, 1987; U.S. Pat. No. 4,717,213, which issued to K. Bohnet et al on Jan. 5, 1988; U.S. Pat. No. 5,139,320, which issued to H. Banker on Aug. 18, 1992 and U.S. Pat. No. 5,213,209, which issued to J. Song on May 25, 1993.

In spite of the large variety of devices presently available (at least on paper), the problems outlined above still exist. This is evidenced by the fact that virtually the only compact disc carriers for audio discs currently in use are of the type described above.

GENERAL DESCRIPTION OF THE INVENTION

An object of the present invention is to provide a relatively simple compact disc carrier which can be stacked horizontally rather than vertically, so that the labels are also horizontal on the stacked carriers.

Another object of the invention is to provide a compact disc carrier, which can be releasably latched to similar carriers when stacked horizontally.

Yet another object of the invention is to provide a compact disc carrier which provides a visual indication of whether a disc is present in the carrier.

Accordingly, the present invention relates to a disc carrier comprising:

(a) container means, said container means including
  (i) an opening in one end thereof, and
  (ii) slot means in at least one side of said container means; and (b) tray means including
  (i) base means slidable in said container means for insertion of the tray means into said container means and for removal of the tray means from said container means through said opening;
  (ii) disc support means on said base means for supporting a portion of a disc on said tray means; and
  (iii) spring arm means on said base means for engagement by a disc when the tray means is inserted fully into said container means, whereby the spring arm means extends into said slot means to provide a visual indication that a disc is present in the carrier and for retaining of the tray means and disc in the container means.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
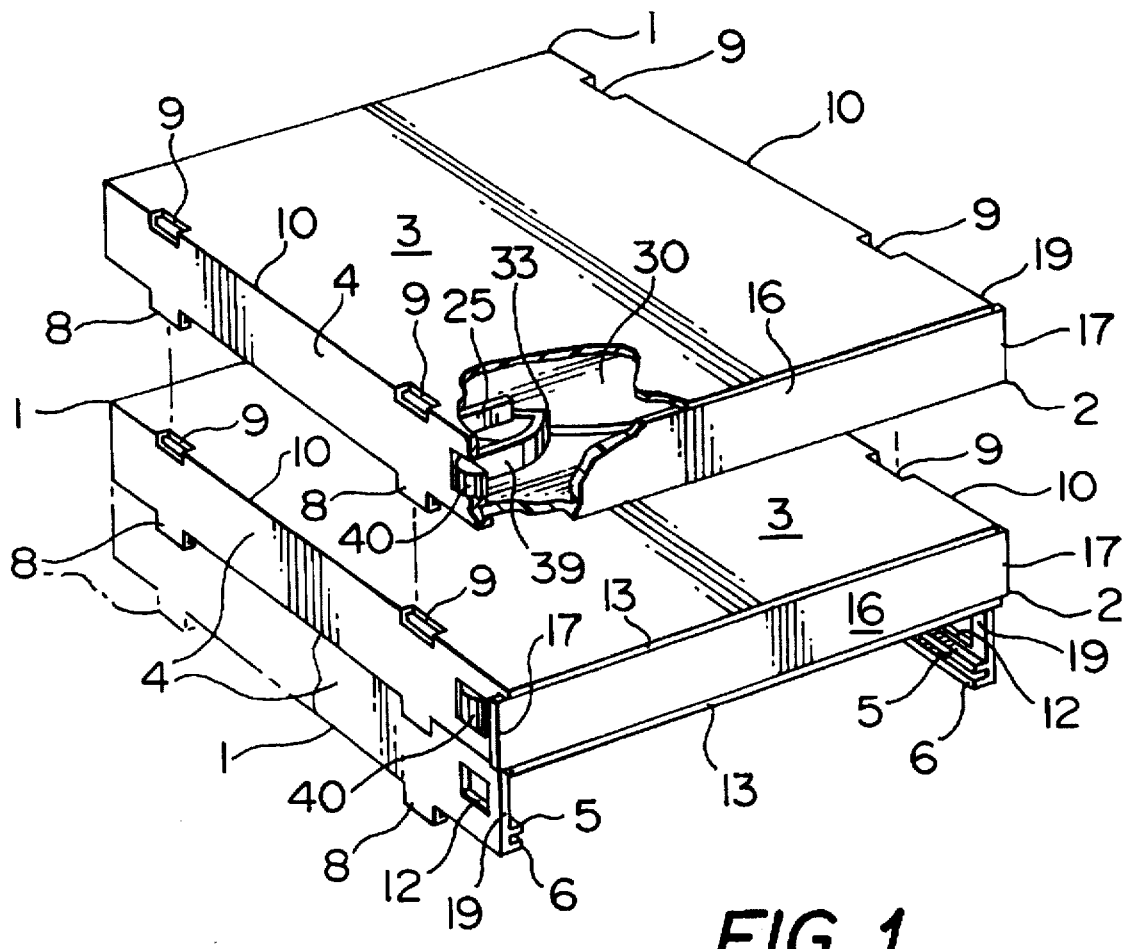
FIG. 1 is an exploded, isometric view of a plurality of compact disc carriers in accordance with the present invention.

With reference to FIG. 1, the preferred embodiment of the compact disc carrier includes a casing or container 1, and a tray 2 slidable in the container 1. The rectangular container 1 is defined by a planar top wall 3, and a pair of side walls 4. A pair of spaced apart, parallel ledges 5 or flanges 6 extend the length of the bottom edge of each side wall 4 defining tracks for slidably receiving the tray 2. An L-shaped finger 8 extends downwardly from the side wall 4 proximate each end thereof. The fingers 8 define detents for insertion into rectangular apertures 9 in a subjacent container 1. The apertures 9 are located in the top corners 10 of the container, i.e. at the junctions between the top wall 3 and the side walls 4. By pressing on the side walls 4, i.e. by squeezing the container 1 between the thumb and the fingers, the fingers 8 are forced outwardly to facilitate insertion or removal of the fingers. As shown in FIG. 1, the fingers 8 and the apertures 9 make it possible to releasably interconnect a plurality of containers stacked horizontally. A slot 12 is provided in each side wall 4 near the open front end 13 of the container 1.

Figure 2:
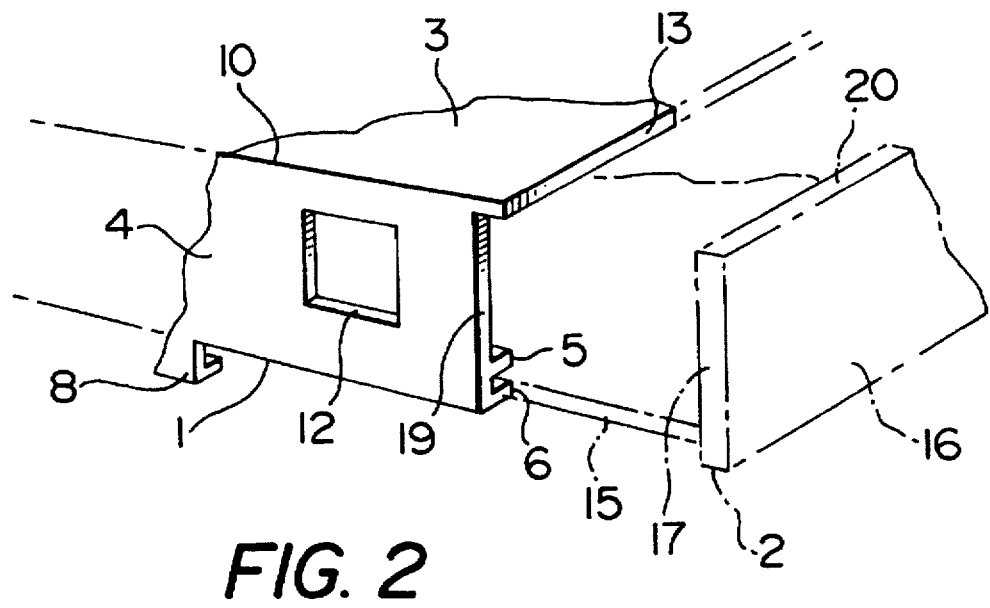
FIG. 2 is an isometric view of one corner of a container used in the carrier of FIG. 1.
Figure 3:
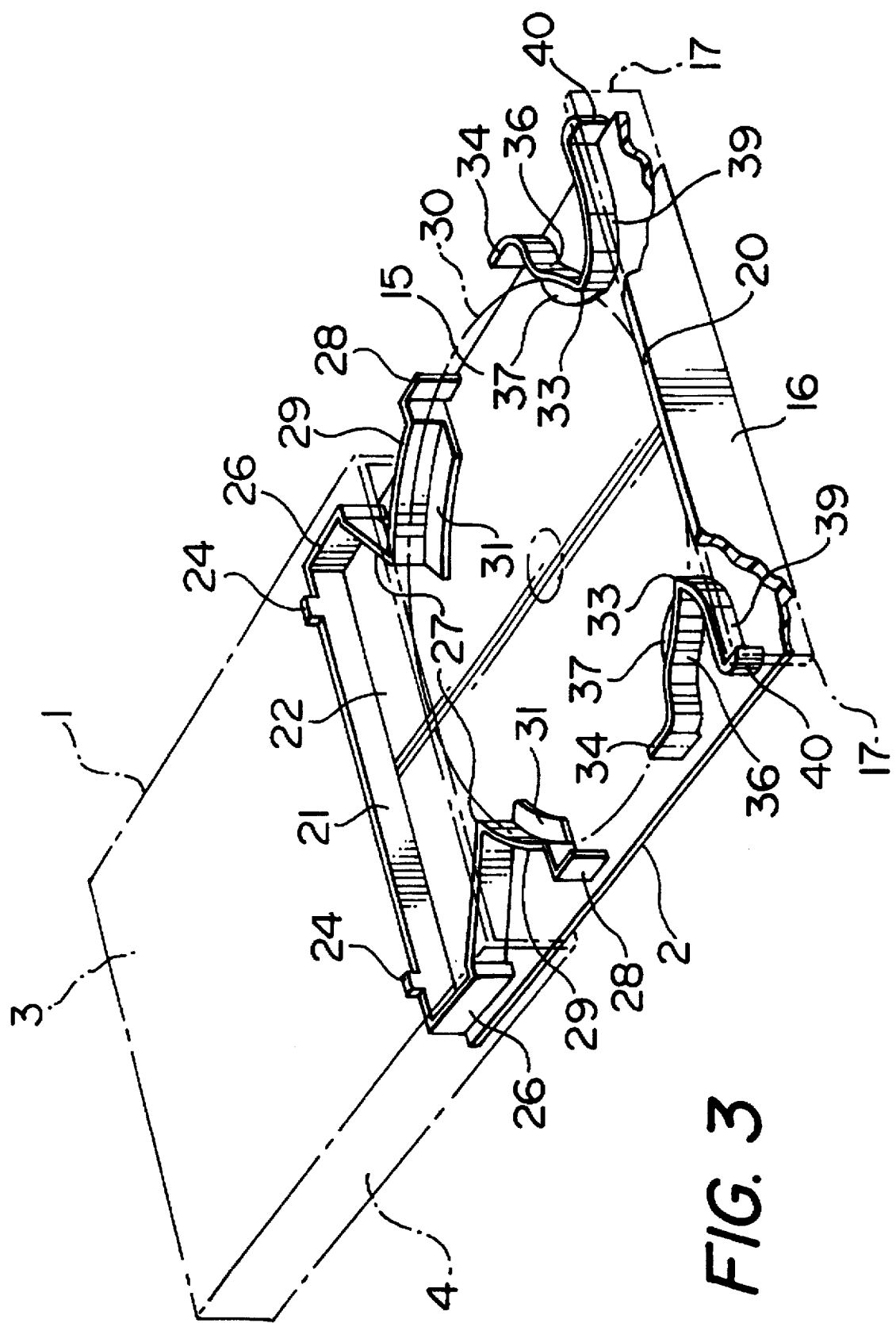
FIG. 3 is an isometric view of a tray for use in the disc carriers of FIG. 1.
Figure 4:
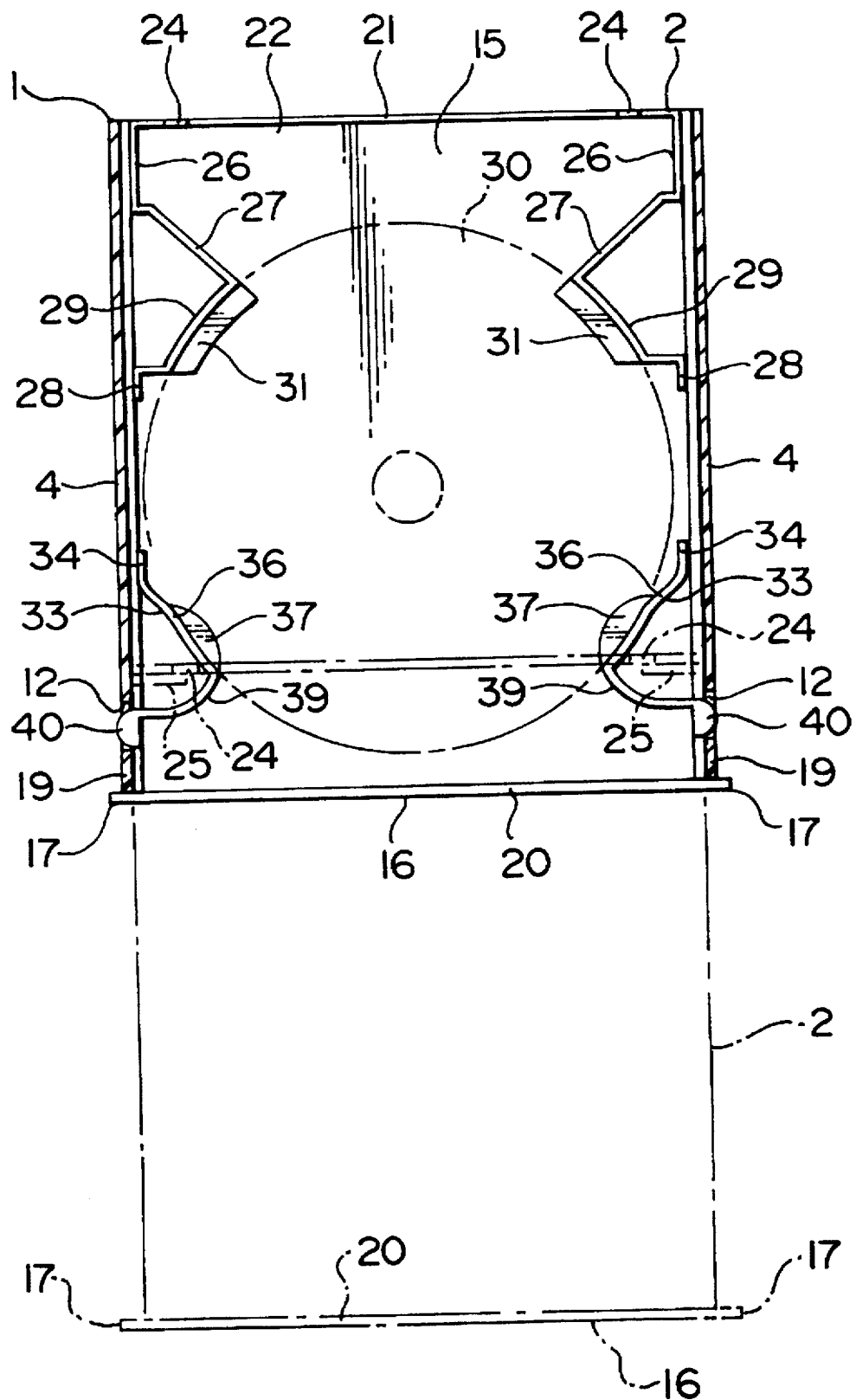
FIG. 4 is a sectional view of the carrier of FIG. 1 taken along the length thereof through the centers of its sides.

Referring to FIGS. 3 and 4, the tray 2 includes a planar, rectangular base plate 15, and a front wall 16 extending upwardly therefrom. The ends 17 of the front wall 16 extend outwardly beyond the front ends 19 of the container, side walls 4 when the tray is inserted into the container 1 for limiting movement of the tray 2 into the container 1 and for facilitating grasping and removal of the tray 2 from the container 1. In the closed position (FIG. 1), the front end 13 of the top wall 3 overlaps the top edge 20 (FIG. 2) of the front wall 16 of the tray 2.

Referring to FIGS. 3 and 4, a rear wall 21 extends upwardly from the end 22 of the base plate 15 opposite the front wall 16. The length of the rear wall 21 is less than the width of the container 1, i.e. slightly less than the spacing between the inner edges of the ledges 5 and 6, so that the tray 2 can slide smoothly into the container 1. A pair of fingers 24 extend upwardly from the top edge of the rear wall 21 near the ends thereof for limiting forward movement of the tray 2 in the container 1. At the outermost position of the tray 2, the fingers 24 engage stop plates 25 (FIGS. 1 and 4) extending downwardly from the top wall 3 of the container 1 at the side walls 4.

Posts 26 integral with the rear wall 21 extend forwardly from such rear wall. The front end of each L-shaped (when viewed from above) post 26 carries a generally V-shaped support arm 27, the front end of which is integral with a post 28 extending upwardly from the base plate 15. The bottom edge of the arm 27 is spaced apart from the top surface of the base plate 15 of the tray 2. The front side 29 of each V-shaped arm 27 is arcuate, with a curvature matching that of a compact disc 30. A ledge 31 extends inwardly and forwardly from the front side 29 of the arm 27 for supporting the rear or inner edge of a compact disc 30 at two spaced apart locations.

A somewhat similar structure is provided at the front end of each side of the tray 2 where a generally V-shaped spring arm 33 extends forwardly and inwardly from a post 34. The posts 34 are aligned longitudinally with the posts 26 and 28 for sliding against the inner free edge of the ledge 5 when the tray is moved longitudinally of the container 1. Thus, the posts 26, 28 and 34 ensure smooth, straight line movement of the tray 2 in the container 2. The arm 33, which is integral with the post 34, is spaced apart from the bottom wall 15 of the tray 2. The rear side 36 of each arm 33 is arcuate with a curvature matching that of the compact disc 30. A ledge 37 extends generally inwardly and rearwardly from the sides 36 of the arms 33 for supporting the front edge of the compact disc 30 at two spaced part locations diametrically opposed to the locations of the support by the rear ledges 31.

The front side 39 of each arm 33 is arcuate. In its rest position (FIG. 4), the front end 39 curves outwardly so that a semicircular tab on the outer free end thereof is in the vertical plane containing the posts 26, 28 and 34, so that a tray 2 can slide freely into and out of the container 1 if no disc is present on the ledges 31 and 37. The tabs 40 on the arms 33 act as an indicator that a disc 30 is located on the tray 2 when the tray is fully inserted into the container 1. In the rest position of the arms 33, i.e. with no disc present on the tray 2, the spacing between the ledges 31 and 37 is such that a disc 30 can be placed on such ledges only by moving the arms 33 apart slightly. If no disc 30 is placed on the ledges 31 and 37, and the tray 2 is slid into the container 1, the tabs 40 merely slide loosely against the side walls 4 of the container 1. When the tray 2 is inserted fully into the container 1, the tabs 40 do not extend outwardly through the slots 12. Thus, if an empty tray 2 is fully in a container 1, it is merely necessary to tilt the stack of containers forwardly whereupon the empty tray will slide out (forwardly). On the other hand, if a disc 30 is placed on the ledges 31 and 37 by manually moving the arms 33 slightly apart, and the tray 2 is slid into the container 1, when the tabs 40 engage the front edges 19 of the side walls 4 of the container 1, the rear sides 36 of the arms 33 are restrained by the side edge of the disc 30. Because movement of the rear sides 36 of the arms 33 is thus limited, the front sides 39 of the arms bend forwardly. When the tray 2 is slid fully into the container 1, the front sides 39 of the arms 33 spring outwardly, so that the tabs 40 extend through the slots 12 beyond the outer surfaces of the container side walls 4, providing a visual indication that disc 30 is on the tray 2, i.e. in the carrier. The tabs 40 also prevent movement of the tray 2 relative to the container 1, i.e. sliding of the tray 2 out of the container 1. In order to remove the tray 2, the free ends 17 of the front wall 16 of the tray are grasped to pull the tray 2 with the disc 30 to the fully open position (shown in phantom outline in FIG. 4), permitting removal of the disc 30. During outward movement of the tray 2, the front sides 39 of the arms 33 flex so that the tabs 40 move inwardly and slide against the inner surface of the side walls 4 of the container 1. If no disc 30 is present on the tray 2, and the free ends 17 of the front wall 16 are grasped to pull the tray out of the container 1, the tabs 40 offer no resistance.

Thus, there has been described a disc carrier which includes a container with a latch or interlocking mechanism permitting the stacking of carriers to form a uniform package which is easy to carry. Labels can be placed against the front wall of the tray with the words appearing in a horizontal row for easy reading. The tabs on the ends of the spring arms provide a visual indication of whether a disc is present in the carrier. Finally, the carrier is defined by two elements only rather than three as in the case of the popular current version of carrier which results in cost reductions in both manufacture and assembly.

I claim:

1. A disc carrier comprising:
   (a) container means for storing a compact disc, said container means including
      (i) an opening in one end thereof, and
      (ii) slot means for providing a visual indication that a disc is present in the carrier through at least one side of said container means; and
   (b) tray means for receiving a compact disc including
      (i) base means slidable in said container means for insertion of the tray means into said container means and for removal of the tray means from said container means through said opening;
      (ii) disc support means on said base means for supporting a portion of a disc on said tray means; and
      (iii) spring arm means on said base means for engagement by a disc when the tray means is inserted fully into said container means, whereby the spring arm means extends into said slot means to provide a visual indication that a disc is present in the carrier and for retaining of the tray means and disc in the container means.

2. A disc carrier according to claim 1, wherein said container means includes a top wall; side walls means; and track means in said side walls for slidably receiving said tray means.

3. A disc carrier according to claim 2, wherein said base means includes a base plate slidable in said track means; and a front wall on one end of said base plate for closing said opening in said one end of said container means when said tray means is inserted fully into said container means.

4. A disc carrier according to claim 3, including stop means for limiting outward movement of said tray means, whereby said tray means remains in said container means in the fully open, disc insertion or removal position.

5. A disc carrier according to claim 4, wherein said stop means includes a rear wall on the other end of said base plate; a finger extending upwardly from said base plate; and stop plate means extending downwardly from said top wall of said container means for engaging said finger when the tray means slides to the fully open position in said container means.

6. A disc carrier according to claim 3, wherein said track means includes first and second spaced apart flange means extending inwardly from the bottom of said side wall for slidably receiving said base plate.

7. A disc carrier according to claim 2, including a latch on said container means, said latch including an aperture in said top wall and one of said side wall; and a detent vertically aligned with said aperture and extending downwardly from a bottom end of said side wall for insertion into said aperture when one disc carrier is placed on a second similar disc carrier, flexing of said side wall permitting insertion or removal of said detent from said aperture.

8. A disc carrier according to claim 1, including latch mean on said container means, whereby similar carriers can be releasably interconnected when stacked horizontally.

9. A disc carrier comprising:
   (a) container means for storing a compact disc, said container means including
      (i) an opening in one end thereof, and
      (ii) slot means for providing a visual indication that a disc is present in the carrier through at least one side of said container means; and
   (b) tray means for receiving a compact disc including
      (i) base means slidable in said container means for insertion of the tray means into said container means and for removal of the tray means from said container means through said opening;
      (ii) support arm means on a rear end of said base means for supporting at least a portion of a disc on said tray means;
      (iii) flexible spring arm means on said base means opposing said support arm means for supporting a second portion of a disc on said tray means, said support and spring arm means permitting unimpeded insertion or removal of the tray means from the container means when no disc is present on the tray means, the spacing between said support and spring arm means in a rest position being insufficient to permit unimpeded insertion of a disc between the support and spring arm means, whereby it is necessary to flex said spring arm means to place a disc on said tray means and to insert the tray means carrying a disc into said container means, and full insertion of said tray means into said container means causes said spring arm means to flex to a second position;
      (iv) tab means on said spring arm means for projecting through said slot means in the container means when the tray means is inserted fully into said container means to provide a visual indication that a disc is present in the carrier.

10. A disc carrier according to claim 9, wherein said support arm means includes a pair of fixed support arms on the rear end of a base plate; and said spring arm means includes a pair of spring arms diametrically opposed to said fixed support arms on the front of said base plate.

11. A disc carrier according to claim 10, including ledge means on each said support and spring arm for supporting a disc.

12. A disc carrier according to claim 11, wherein each said spring arm includes an arcuate rear position carrying said ledge means; and a front portion carrying said tab means.

* * * * *